United States Patent Office 3,485,745
Patented Dec. 23, 1969

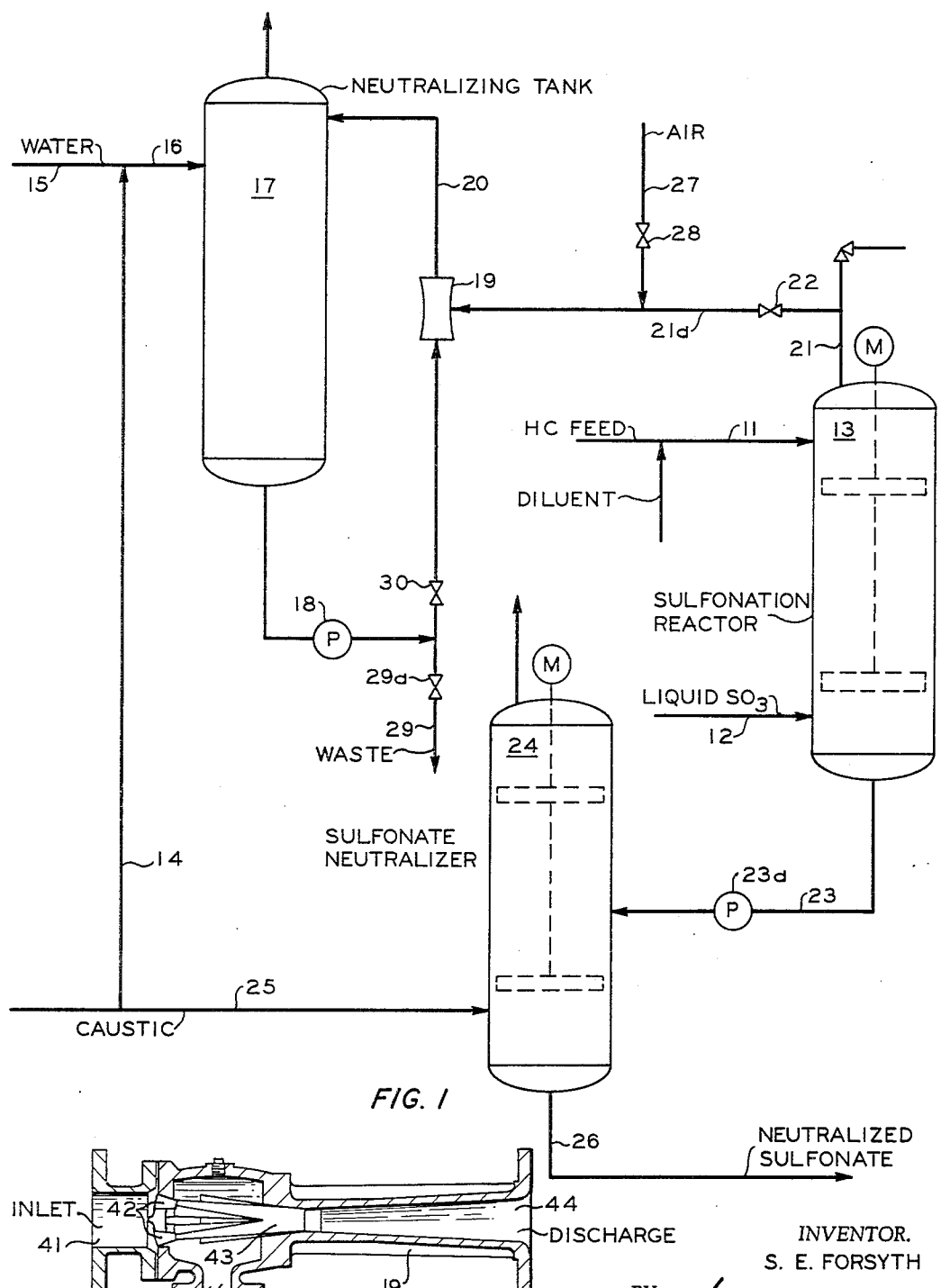
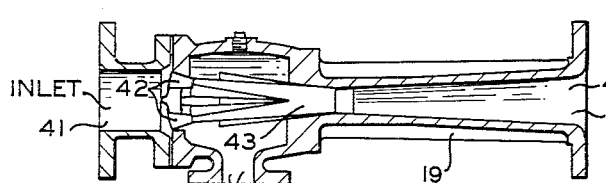

3,485,745
METHOD FOR SULFONATION OF HYDROCARBONS AND DISPOSAL OF GASES THEREFROM
Samuel E. Forsyth, Bartlesville, Okla., assignor to Phillips Petroleum Company, a corporation of Delaware
Filed Dec. 27, 1966, Ser. No. 604,798
Int. Cl. C10c 3/02; B01d 53/34; C01d 5/04
U.S. Cl. 208—44
2 Claims

ABSTRACT OF THE DISCLOSURE

Disclosed is a method for sulfonation of hydrocarbon, particularly asphaltic materials, by contact with $SO_3$ and for disposal of the gaseous $SO_2$ produced therefrom by reacting the $SO_2$ with NaOH being continuously circulated from a source of NaOH to an eductor and from the eductor to said source so as to convert the $SO_2$ to harmful $NaSO_3$, and subsequently contacting the harmful $NaSO_3$ with air to convert the $NaSO_3$ to nonharmful $NaSO_4$.

This invention relates to a method for hydrocarbon sulfonation and $SO_2$ neutralization. In another aspect the invention relates to a method for spent caustic oxidation.

Sulfonated hydrocarbons are useful in many applications. One important application of sulfonated hydrocarbons, particularly neutralized sulfonated asphalts, is use as additives for oil well drilling muds. When sulfonated with sulfur trioxide in a single step, the subsequently neutralized product contains undesirably high quantities of sodium salts. I overcome this problem by conducting the sulfonation in two steps. In the first step the hydrocarbon is contacted in solution with liquid sulfur trioxide, and a substantial quantity, e.g., 30 percent, is converted to sulfur dioxide by an unavoidable side reaction, which is evolved as a gas. In the second step the produced $SO_2$ is removed from the sulfonation zone prior to neutralization of the sulfonated product. This substantially reduces the quantity of sulfur compound present in tthe sulfonated product. Hence, upon neutralization of the sulfonated product with strong caustic, the quantity of sodium salts in the sulfonated product is very substantially reduced, and the value of the product as a drilling mud additive is correspondingly increased.

It is a feature of the invention that the sulfur dioxide evolved in and removed from the first step sulfonation is neutralized in the $SO_2$ neutralization zone in a novel manner so that it may be disposed of without harmful effects on marine life. To this end, the sulfur dioxide is removed from the sulfonation zone and is introduced, advantageously by an eductor, into a circulating stream of caustic solution. The vapors comprising $SO_2$ from one or several first stage sulfonation treatments are so contacted with the caustic solution until it is nearly, but not entirely spent, i.e., until its pH is reduced to a value of 8 to 9.

At this pH range, the produced sodium sulfite, which is harmful to marine life, is oxidized at a maximum rate by the air to the harmless sodium sulfate. The oxidation gas (e.g., air) is introduced, advantageously by the same eductor, into the circulating stream of produced sodium sulfite present now in the $SO_2$ neutralization zone. The reaction rate for oxidation of sodium sulfite to sodium sulfate decreases rapidly for lower pH solutions. The caustic solution can then be readily disposed of without pollution of the stream into which it is discharged since it now contains the harmless sodium sulfate.

An object of the invention is to provide improved fluid handling.

Another object of the invention is to sulfonate hydrocarbons and to remove undesired materials from the sulfonated product.

Another object of the invention is to oxidize spent caustic solution which has been used to neutrailize $SO_2$ in direct contact reaction.

Other aspects, objects, and the advantages of the invention are apparent in the written description, drawing, and the claims.

According to the invention, a hydrocarbon capable of being sulfonated is treated with a sulfonating agent, and $SO_2$ from this treatment is contacted with an $SO_2$ neutralizing agent; the treating and contacting steps are repeated until the neutralizing agent is substantially spent, after which an oxidizing agent is introduced into the substantially spent neutralizing agent. The $SO_2$ from the sulfonation step can be withdrawn from the sulfonation zone and contacted with neutralizing agent circulated from a neutralization zone through a contacting zone which communicates with the sulfonation zone. Preferably, communication can also be provided between the contacting zone and a source of oxidizing agent and thus the substantially spent neutralizing agent can be contacted with the oxidizing agent by closing communication with the sulfonation zone, opening communication with the source of oxidizing agent, and circulating the spent neutralizing agent through the contacting zone while introducing oxidizing agent into the contacting zone.

Preferably, the contacting zone is formed by an eductor. An eductor comprises means whereby fluid circulating therethrough from a first zone of fluid creates a zone of reduced pressure (a suction) which communicates with a second source of fluid. Fluid from the second source is thus caused to flow into the stream of fluid from the first zone.

By the use of the eductor, circulating neutralizing agent provides suction whereby $SO_2$ is withdrawn from the sulfonation zone into contact with the neutralizing agent during the neutralization steps and circulating spent neutralizing agent provides suction whereby oxidizing agent is introduced from the source of oxidizing agent into contact with the spent neutralizing agent.

Any suitable hydrocarbon can be used in the sulfonation step. One class of hydrocarbons suitable for the practice of the invention are asphalts; for example, asphalts having Ring and Ball Softening Points in the range of 115–260° F. When using such an asphalt, preferably the asphalt is mixed with a diluent such as n-hexane or similar hydrocarbons in the $C_5$–$C_{15}$ range. Such a mixture can be formed by using a colloid mill.

Any suitable sulfonation agent can be used. Liquid sulfur trioxide is commercially available and is advantageously used in the sulfonation step.

Sulfonic acids produced by the sulfonation reaction can be neutralized with a basic neutralization agent; for example, anhydrous or aqueous ammonia or an aqueous solution or slurry of an alkali metal or alkaline earth metal oxide or hydroxide to convert the sulfonic acid to the corresponding ammonium or metal sulfonate.

The sulfur dioxide ($SO_2$) produced by the sulfonation reaction is neutralized with a basic neutralizing agent. Included among suitable neutralizing agents are aqueous ammonia, an aqueous solution of an alkali metal oxide, or hydroxide to convert the $SO_2$ to the corresponding ammonium or soluble metal sulfite. Sodium and potassium compounds are particularly suitable and a preferred neutralizing agent is an aqueous caustic solution; for example, aqueous sodium hydroxide. It is preferred that the neutralizing agent be spent maximum to a pH of 8.5 prior to oxidation. The pH should be tested to determine the optimum replacement point since overspent caustic can present equipment metallurgical problems and underspent caustic can present disposal problems.

The oxidizing agent is one which is capable of oxidizing a sulfite to a sulfate. A preferred oxidizing agent is air from the atmosphere.

Further, according to the invention, there are provided hydrocarbon treating means comprising a sulfonation reactor with means to feed a hydrocarbon and a sulfonating agent into the reactor. A neutralizing tank, adapted to contain a neutralizing agent, is provided with means to circulate fluid from the tank through a contacting zone and back to the tank. Means are also provided whereby communication can be established between the contacting zone and the sulfonation reactor and between the contacting zone and the source of oxidizing agent. Preferably, the contacting means comprises an eductor whereby the circulating neutralizing agent educts $SO_2$ from the sulfonation zone or oxidizing agent from the source thereof. The sulfonation reactor and neutralizing tank are also provided with discharge means.

FIGURE 1 is a schematic diagram of a hydrocarbon sulfonation apparatus.

FIGURE 2 is a cross-section of the eductor illustrated in FIGURE 1.

In FIGURE 1, pipes 11 and 12 communicate with sulfonation reactor 13 for the introduction thereto of hydrocarbon feed and sulfonation agent, respectively. Pipes 14 and 15 communicate with pipe 16 for the introduction of neutralizing agent and water thereinto and subsequently into neutralizing tank 17. Pump 18 is provided for circulating fluid from neutralizing tank 17 through educator 19 and pipe 20 back to tank 17. Pipe 21 connects the upper portion of reactor 13 with pipe 21A. Pipe 27 is open to the atmosphere and also communicates with pipe 21A. Valves 22 and 28 are provided in pipes 21A and 27, respectively, as shown. Pipe 21A connects with eductor 19. Sulfonate neutralizer 24 is provided and communicates with the lower portion of reactor 13 through pipe 23. Pump 23A is provided, as shown. Pipe 25 is provided for supplying sulfonate neutralizing material to neutralizer 24. As illustrated in the drawing, the same material used as the neutralizing agent in neutralizer 24 is used, when diluted with water, as the neutralizing agent in tank 17. Pipe 29, provided with valve 29A, is provided for removal of oxidized, spent neutralizing agent from tank 17 and valve 30 is provided to direct flow through pipe 29 and eductor 19.

As illustrated in FIGURE 2, eductor 19 comprises circulating inlet 41, nozzles 42, converging throat 43, diverging discharge 44, and suction inlet 45. A fluid entering inlet 41 and flowing through nozzles 42 is directed into throat 43 and is discharged through diverging discharge 44 and creates a reduced pressure (suction) at suction inlet 45.

In operation, a concentrated aqueous neutralizing agent stream, e.g., caustic soda solution, is passed through pipe 14, diluted with water from pipe 15, and passed through pipe 16 into tank 17. A sulfonatable hydrocarbon is fed into reactor 13 through pipe 11 and a sulfonating agent, e.g., sulfur trioxide, is fed into reactor 13 through pipe 12. With valves 22 and 30 open and valves 28 and 29A closed, neutralizing agent is circulated by pump 18 through eductor 19 and pipe 20 to tank 17. Since pipe 21A is connected with suction inlet 45 of eductor 19, $SO_2$ and some unreacted $SO_3$ are withdrawn from the upper portion of reactor 13 into contact with the neutralizing agent and the resulting stream returned to tank 17. Sulfonated hydrocarbon is removed from sulfonation reactor 13 through pipe 23 by pump 23A and fed to neutralizer 24. A concentrated neutralizing agent, e.g., aqueous caustic soda, is fed to neutralizer 24 through pipe 25. The neutralized sulfonate is withdrawn from neutralizer, through pipe 26 for any further desired processing.

The sulfonation reaction is carried on in a batch manner and $SO_2$ is withdrawn through eductor 19 from each batch until the neutralizing agent in neutralizer tank 17 is substantially spent. When the neutralizing agent is substantially spent, valve 22 is closed and valve 28 is opened and the neutralizing agent is circulated through eductor 19, thus introducing air from the atmosphere into the neutralizing agent and the resulting stream circulated back to tank 17. When the neutralizing agent is sodium hydroxide, a product of the $SO_2$ neutralization is sodium sulfite and the oxidizing step converts the sodium sulfite to sulfate, a more readily disposable waste material. When the conversion has been carried on to the desired degree, valve 30 is closed and valve 29 is opened, thus permitting the discharge of disposable waste through pipe 29.

It will be understood by those skilled in the art that many details have been eliminated from the drawing to simplify and clarify the description of the invention and that such details can readily be added. For example, additional material, controls, duplication of items of equipment described, etc. can be and, in most instances, will be provided.

EXAMPLE

In an example according to the invention, a stream of asphalt is diluted with normal hexane and the diluent stream fed into sulfonation reactor 13 through pipe 11. Liquid $SO_3$ is fed into reactor 13 through pipe 12. Sulfonation reactor 13 is a vessel 4 feet in diameter with a height of 15 feet and is equipped with a 24-inch turbine mixer using stator rings and four-bladed paddles. Neutralizer 24 also is a vessel 4 feet in diameter with a height of 15 feet and similarly equipped with a 24-inch turbine mixer with stator rings and four-bladed paddles. Neutralizing tank 17 also is a vessel 4 feet in diameter with a height of 15 feet, and is adapted to contain caustic. Eductor 19 is constructed from stainless steel. Operating conditions within the various vessels are given in Table I, below.

TABLE I.—OPERATING CONDITIONS

| Property/Unit | Neutralizing Tank 17 | Sulfonation Reactor 13 | Sulfonate Neutralizer 24 |
|---|---|---|---|
| Temp., °F | 100–120 | 80–90 | 100–120 |
| Pressure, p.s.i.g | 1 | 1 | 1 |
| Contact time, min | 40 | 40 | (¹) |

¹ Neutralize as fast as possible without exceeding 120° F. on tank mixture.

The composition of the various streams are given in Table II, wherein the stream numbers correspond with the pipe numbers in FIGURE 1.

The asphalt is one having a Ring and Ball Softening Point of 175° F. and is produced by the distillation of West Texas crude. The asphalt-normal hexane mixture is sulfonated in reactor 13 until the final product is 70 weight percent water soluble. The $SO_3$ is maintained at a temperature of 85° F. The sulfonated product in reactor 13 is fed by pump 23A through pipe 23 into neutralizer 24. The neutralizing agent, aqueous NaOH (50 percent by weight NaOH), is fed into the sulfonate neutralizer 24 by pipe 25. Mixing, cooling, and the addition of neutralizing agent are continued until the neutralizer 24 liquid contents test about 9 pH. The concentrated aqueous sodium hydroxide in pipe 14 is diluted with water from pipe 15 to produce dilute aqueous NaOH (10 percent by weight NaOH) which is charged to neutralizing tank 17 by pipe 16.

The dilute aqueous NaOH in neutralizing tank 17 is utilized during each sulfonation cycle to neutralize the $SO_2$ vapors evolved in and withdrawn overhead from reactor 13. Each dilute caustic fill in tank 17 will accommodate about seven consecutive sulfonation batches before being spent far enough to require replacement. Each fill of dilute caustic in tank 17 is considered spent when its pH has been reduced to 8.5. This is considered optimum, because of the subsequent oxidation treatment required by anti-pollution laws before the spent solution can be disposed of as waste through pipe 29.

TABLE II.—BATCH OPERATION POUNDS/BATCH

| | Stream | | | | | | |
|---|---|---|---|---|---|---|---|
| | (11) Asphalt | (15) Normal hexane | (12) Water | (25) SO₃ | (26) 50% Caustic | (29) Diluted product | Waste |
| Material: | | | | | | | |
| Asphalt | 1,100 | | | | | | |
| Normal hexane | | 1,100 | | | | 1,100 | |
| SO₃ | | | | 550 | | | |
| NaOH | | | | | 433 | | |
| Water | | | 2,510 | | 433 | 118 | 2,950 |
| Sulfonated asphalt | | | | | | 1,400 | |
| Na₂SO₄ | | | | | | 8 | 550 |
| Total | 1,100 | 1,100 | 2,510 | 550 | 866 | 2,626 | 3,500 |

Reasonable variations and modifications are possible within the scope of the invention which sets forth a method for fluid handling including a method for hydrocarbon sulfonation and SO₂ neutralization, and method and apparatus for spent caustic oxidation.

What is claimed is:

1. A method for the disposal of sulfur dioxide resulting from sulfonating hydrocarbons comprising:
   (a) reacting a hydrocarbon with sulfur trioxide in a sulfonation zone wherein a substantial portion of the sulfur trioxide is converted to vaporous sulfur dioxide;
   (b) withdrawing the vaporous sulfur dioxide from the sulfonation zone;
   (c) reacting the withdrawn sulfur dioxide with air and caustic solution in a neutralization zone, the amount of sulfur dioxide being sufficient to reduce the pH of the caustic solution to a value within the range of 8 to 9, whereby the resulting caustic salts are present principally as the sulfate; and
   (d) discharging the solution as unharmful waste into a body of water.

2. The method of claim 1 wherein claim 1(c) further comprises the steps of:
   (a) removing sodium hydroxide-containing stream from a source of sodium hydroxide;
   (b) introducing the sodium hydroxide-containing stream into a neutralization zone;
   (c) reacting the sulfur dioxide with said sodium hydroxide in said neutralization zone to produce sodium sulfite;
   (d) introducing the produced sodium sulfite into the source of sodium hydroxide;
   (e) repeating steps (a) through (d) with a sufficient amount of sulfur dioxide to reduce the pH of the source to a value within the range of 8 to 9; and
   (f) contacting the sodium sulfite with sufficient air to convert substantially all the sodium sulfite to sodium sulfate.

References Cited

UNITED STATES PATENTS

| | | | |
|---|---|---|---|
| 2,041,584 | 5/1936 | Adler | 210—63 |
| 3,089,842 | 5/1963 | Stratton | 208—44 |
| 3,108,060 | 10/1963 | Matthews | 208—44 |
| 3,186,942 | 6/1965 | Benger | 210—63 |
| 3,006,846 | 10/1961 | Stratton | 208—44 |

DELBERT E. GANTZ, Primary Examiner

V. O'KEEFE, Assistant Examiner

U.S. Cl. X.R.

210—63